United States Patent
Lloyd

(10) Patent No.: US 9,462,029 B2
(45) Date of Patent: Oct. 4, 2016

(54) INVOKING SERIALIZED DATA STREAMS

(75) Inventor: David Lloyd, Belleville, WI (US)

(73) Assignee: Red Hat, Inc., Raleigh, NC (US)

( * ) Notice: Subject to any disclaimer, the term of this patent is extended or adjusted under 35 U.S.C. 154(b) by 1407 days.

(21) Appl. No.: 12/201,293

(22) Filed: Aug. 29, 2008

(65) Prior Publication Data

US 2010/0058367 A1     Mar. 4, 2010

(51) Int. Cl.
  *G06F 3/00* (2006.01)
  *H04L 29/06* (2006.01)
  *G06F 9/54* (2006.01)

(52) U.S. Cl.
  CPC ............ *H04L 65/605* (2013.01); *G06F 9/542* (2013.01)

(58) Field of Classification Search
  CPC ................................ H04L 67/42; G06F 9/54
  USPC ................... 719/310, 328, 330, 319
  See application file for complete search history.

(56) References Cited

U.S. PATENT DOCUMENTS

| | | | | |
|---|---|---|---|---|
| 6,058,429 A * | 5/2000 | Ames et al. | ........... | 709/242 |
| 6,747,554 B1 * | 6/2004 | Higashimura et al. | ....... | 340/506 |
| 6,859,834 B1 * | 2/2005 | Arora et al. | ........... | 709/227 |
| 7,062,475 B1 * | 6/2006 | Szabo et al. | ........... | 706/11 |
| 7,460,038 B2 * | 12/2008 | Samuels et al. | ........... | 341/87 |
| 7,647,614 B2 * | 1/2010 | Krikorian et al. | ........... | 725/94 |
| 7,739,688 B1 * | 6/2010 | Evans | ........... | 719/316 |
| 7,853,647 B2 * | 12/2010 | Maes | ........... | H04M 7/006 |
| | | | | 709/203 |
| 7,987,265 B2 * | 7/2011 | Fukuzawa et al. | ........... | 709/225 |
| 2003/0101054 A1 * | 5/2003 | Davis | ........... | G10L 15/26 |
| | | | | 704/235 |
| 2004/0071088 A1 * | 4/2004 | Curcio et al. | ........... | 370/235 |
| 2005/0021661 A1 * | 1/2005 | Duloutre | ........... | G06F 17/3048 |
| | | | | 709/217 |
| 2007/0106671 A1 * | 5/2007 | Uchida et al. | ........... | 707/10 |
| 2008/0231480 A1 * | 9/2008 | Lai et al. | ........... | 341/51 |
| 2010/0241747 A1 * | 9/2010 | Guo et al. | ........... | 709/225 |

OTHER PUBLICATIONS

Richard M. Adler, Distributed Corrdination Models for Client/Server computing, 1995.*

* cited by examiner

*Primary Examiner* — Lechi Truong
(74) *Attorney, Agent, or Firm* — Lowenstein Sandler LLP

(57) ABSTRACT

Embodiments relate to systems and methods for invoking serialized data streams. A requester, such as a client computer, can request a set of data from a proxy server using a marker object containing references to remote data sources. The requester and proxy server can each host a handler object to manage marker objects communicated between the two. After receipt of the data request, the proxy server can communicate with the remote data source to initiate a serialized data stream from the remote data source to the requester. In embodiments, the marker object can indicate that the source data hosted on the remote data server should be transmitted directly to the requester, and be streamed in continuous fashion rather than be divided into pieces of data requiring separate requests. In embodiments, marker objects can be nested within other marker objects to invoke multiple serialized streams.

20 Claims, 4 Drawing Sheets

US 9,462,029 B2

INVOKING SERIALIZED DATA STREAMS

FIELD

The present teachings relate to systems and methods for invoking serialized data streams, and more particularly to platforms and techniques for transparently generating a serialized data stream from a remote source to a requestor via an intermediate proxy server.

BACKGROUND OF RELATED ART

In networked computing platforms, it is a frequent requirement to permit one application or process to communicate with, or execute on, a remote environment. An application or process, for example, may need to communicate with a remote data source, such as a remote database server, to retrieve data located at that source or perform other functions. Known mechanisms for permitting a local process to communicate with or execute on a remote space include remote procedure calls (RPCs), which in the case of object-oriented software can be referred to as remote invocations.

When a local process desires to communicate with a server to access data, that remote server may in turn need to access a remote database or other resource to satisfy the request. However, according to known remote invocation technology, issues in creating a high-bandwidth channel to the requester can arise. A significant drawback resides in the fact that some data is not stored in a native serialized format, so that the requester or the remote server may have to generate a large series of small requests to extract the needed information from the remote database, component by component.

Furthermore, existing invocation platforms do not permit or contemplate the encapsulation of a series of requests to build the delivery of a set of serialized data from a remote source. Developers wishing to cause local processes to access remote data sources may therefore have to accept a performance penalty, by writing or triggering a series of requests for small amounts of data to simulate a serialized data stream. For some delivery purposes, such as delivery of video or other media content, this may make effective delivery of the content difficult or impossible. It may be desirable to provide methods and systems for invoking serialized data streams that permit transparent delivery of data to requester processes, without a need to separately handle each constituent piece of data.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for invoking a serialized data stream. More particularly, embodiments relate to platforms and techniques for receiving a data request object from a requester, such as a client device, in a proxy server. The proxy server can receive the data request object and invoke a handler to decompose the data request object, including to obtain a marker object contained in the data request object. The marker object can contain a reference to a remote data source, such as an Internet protocol (IP) address of a remote database or other source. The proxy server can then initiate a serialized data transfer from the remote data source directly to the requester. In embodiments, the proxy server can initiate a Transfer Control Protocol/Internet Protocol (TCP/IP) connection or channel between the remote data source and the requester. The remote data source can host, for instance, data such as media content, database entries, or other information. The remote data source can transmit the serialized data stream to the requester without a need for intermediate handshaking between the requester and proxy server on one side, and the proxy server and the remote data source on the other side. When the data transfer is complete or at other times, the TCP/IP or other connection or channel can be closed at either end, for instance by the remote data source and/or by the requester. In embodiments, the marker object in the data request object can itself contain one or more other marker objects, in a nest configuration. When marker objects are nested, multiple serialized data streams can be initiated at the same time. These and other embodiments described herein address the various noted shortcomings in known remote invocation technology, and provide a programmer, network operator, or other user with more efficient mechanisms for initiating and delivering serialized data streams.

Reference will now be made in detail to exemplary embodiments of the present teachings, which are illustrated in the accompanying drawings. Where possible the same reference numbers will be used throughout the drawings to refer to the same or like parts.

Figure 1:
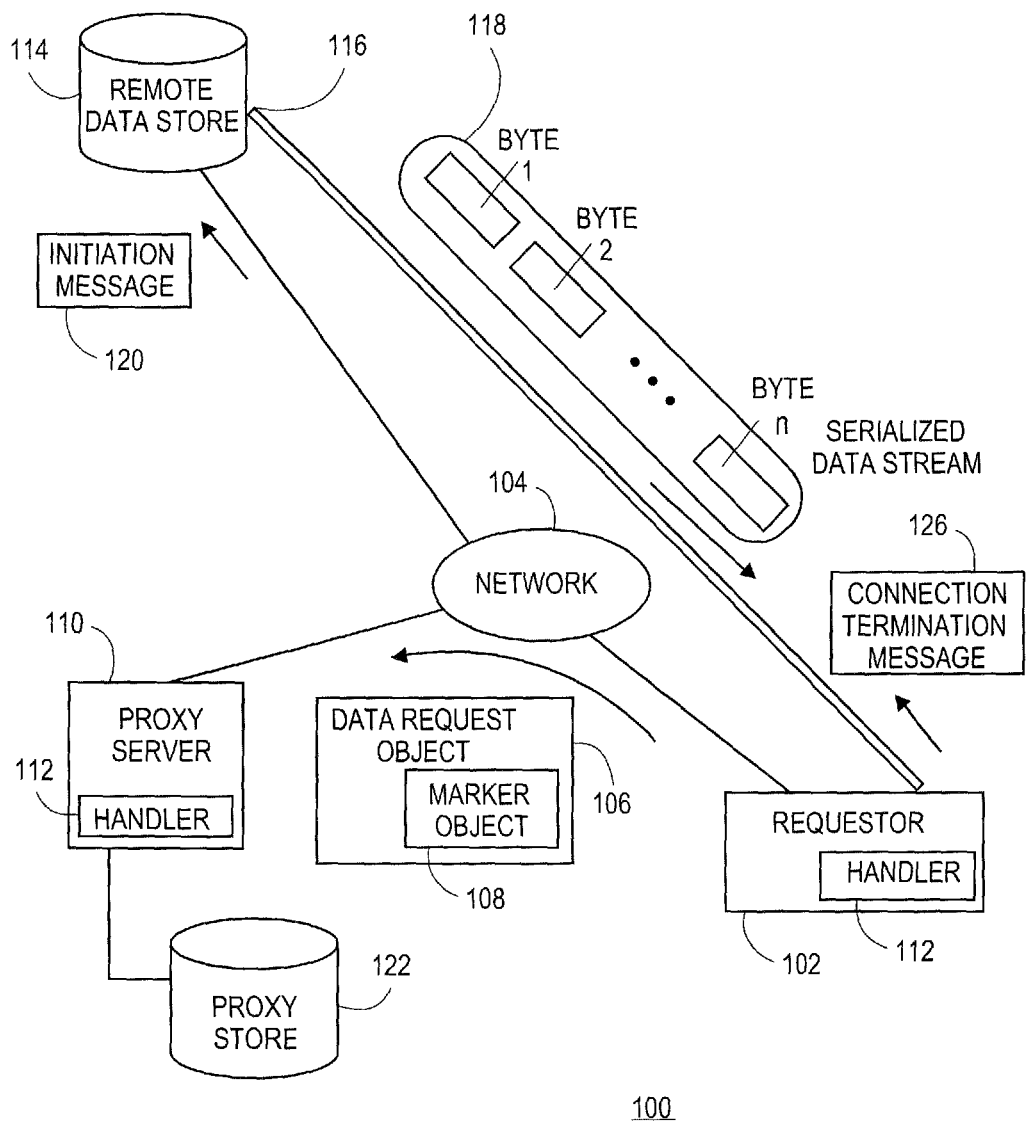
FIG. 1 illustrates an overall system for invoking serialized data streams, according to various embodiments.

FIG. 1 illustrates an overall system 100 in which systems and methods for the invocation of serialized data streams can operate, according to various embodiments of the present teachings. A requestor 102 can communicate with a proxy server 110 via one or more network 104. Requestor 102 can be or include, for example, a client device such as a personal computer, a network-enabled cellular telephone, or other device. One or more network 104 can be or include the Internet, or other public or private networks.

Proxy server 110 can be or include a server and associated resources configured to respond to one or more data request object 106 transmitted to proxy server 110, requesting the invocation of remote data, applications, processes, or other resources by way of proxy server 110. In embodiments, the data request object 106 can request data, applications, processes, or other resources that can execute or be hosted in a different execution space and/or address space than requester 102. In embodiments, data request object 106 can request the delivery of one or more serialized data stream 118 to requestor 102.

More particularly, and as for example illustrated in FIG. 1, requester 102 can transmit data request object 106 to proxy server 110. Data request object 106 can contain a marker object 108, generated for instance by a handler 112 invoked in requester 102. Marker object 108 can contain information identifying the source, nature, and type of serialized data stream 118 which the requester 102 wishes to receive. Marker object 108 can, for example, contain a reference to a remote data source 114 containing the desired data to be transported in serialized data stream 118. Marker object 108 can for instance contain an Internet protocol (IP) address for remote data source 114, or can identify remote data source 114 using other addresses or identifiers. Proxy server 110 can receive and decompose data request object 106 to extract marker object 108 and/or other information necessary to establish a serialized data stream 118 from remote data source 114 to requestor 102.

Proxy server 110 can likewise invoke a handler 112 to decode data request object 106 and process marker object 108 and related information. Proxy server 110 can have an associated proxy store 122, which can for example store lookup tables or other information to identify remote data source 114 as the source of the data requested by requester 102. According to embodiments, once proxy server 110 has located remote data source 114 as the desired source of streamed data, proxy server 110 can transmit an initiation message 120 to remote data source 114. Initiation message 120 can initiate the process of extracting data hosted on remote data source 114 to requester 102 via remote connection 116. It may be noted that initiation message 120 can configure remote data source 114 to transmit data, such as video, audio, or other media content, or database entries, one after the other in continuous or streamed fashion. This results in high-rate data transport to requestor 102, compared to a process of starting and stopping a new connection for each portion of data, incurring higher transmission overhead.

Remote data source 114 can respond to initiation message 120 by establishing remote connection 116 to requestor 102. Remote connection 116 can be or include, for example, a Transfer Control Protocol/Internet protocol (TCP/IP) connection established over a selected port (e.g., port 240) to requester 102. In embodiments, remote connection 116 can be or include other types of connections or channels, such as, for example, H.263 for use in delivering video packets. Other transmission channels, protocols, or connections can be used. Remote data source 114 can respond to initiation message 120 by packing a set of serialized bytes or other units of information in serialized data stream 118. In embodiments, once remote data source 114 has begun to transmit its hosted data to requestor 102, the data transmission can automatically continue via serialized data stream 118, without interruption or necessary handshaking between remote data source 114 and requestor 102. In embodiments, any one of remote data source 114, requester 102, and/or proxy server 110 can terminate the serialized data stream 118 by closing remote connection 116 by transmission of a connection termination message 126, or other instruction or action. In embodiments, remote connection 116 can be closed by those entities or others, for example, when data delivery is complete or when a fault or error condition is detected in the transmission of data to requestor 102.

Figure 2:
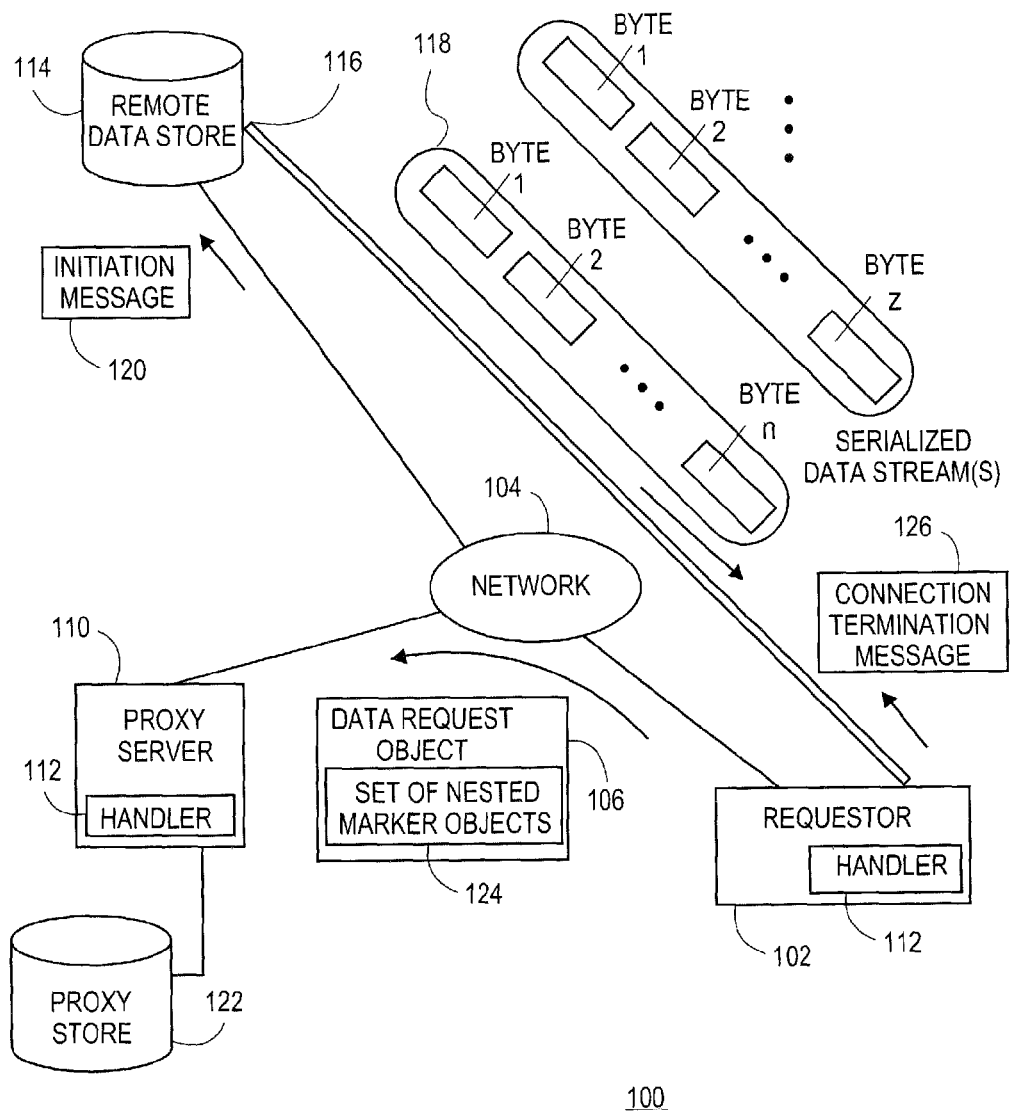
FIG. 2 illustrates an overall system for invoking serialized data streams in further regards, according to various embodiments.

FIG. 2 illustrates an overall system 100 in which systems and methods for invocation of remote data streams can operate, according to embodiments in further regards. In embodiments as shown, requestor 102 can make a request for remote data, applications, processes, or other resources via a data request object 106 transmitted to proxy server 110. As in embodiments shown in FIG. 1, proxy server 110 can invoke a handler 112 to decompose the data request object 106 and decode the constituent data objects being requested by requestor 102. In embodiments as shown in FIG. 2, marker object 108 can contain a further set of nested marker objects 124. In embodiments as shown in that figure, that is, marker object 108 can contain one or more marker objects inserted at a lower nested level which themselves each contain references to a remote data source. In embodiments, handler can process marker object 108 and any set of nested marker objects 124 to locate the lowest-level nested reference to a remote data source, and initiate a serialized data stream 118 associated with that source to transmit data to requestor 102. Handler 112 in proxy server 110 can then process other marker objects in set of nested marker objects 124 to invoke separate or additional serialized data streams. In embodiments in one regard, therefore, requester 102 can request and can receive two or more serialized data streams, simultaneously. In embodiments, those serialized data streams can be initiated, streamed, and closed independently of each other. In embodiments, two or more marker objects in set of nested marker objects 124 can be located at the same hierarchical level, or at different levels.

Figure 3:
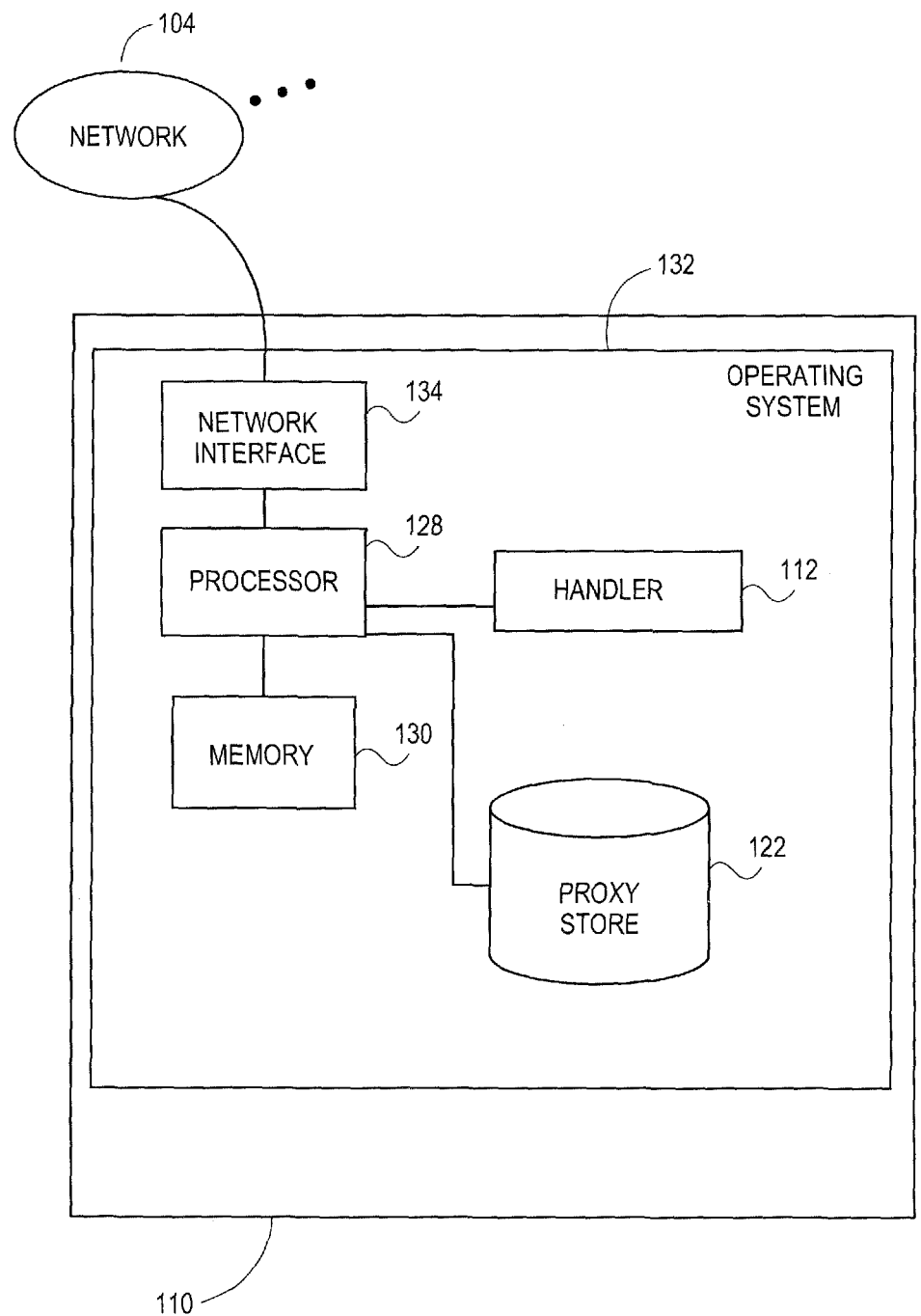
FIG. 3 illustrates an illustrative hardware configuration for a proxy server that can be used to invoking serialized data streams, according to various embodiments.

FIG. 3 illustrates an exemplary configuration of proxy server 110 which can be used in systems and methods for invocation of a serialized data stream, according to embodiments. In embodiments as shown, proxy server 110 can comprise a processor 128 communicating with memory 130, such as electronic random access memory, operating under control of or in conjunction with operating system 132. Operating system 132 can be, for example, a distribution of the Linux™ operating system, the Unix™ operating system, or other open-source or proprietary operating system or platform. Processor 128 also communicates with proxy store 122, such as a database stored on a local hard drive. Processor 128 further communicates with network interface 134, such as an Ethernet or wireless data connection, which in turn communicates with one or more networks 104, such as the Internet or other public or private networks. Processor 128 also communicates with handler 112 and other resources to control the processing of data request object 106, including to decompose data request object 106 and identify one or more marker object 108 contained in that request. Other configurations of proxy server 110, associated network connections, and other hardware and software resources are possible.

Figure 4:
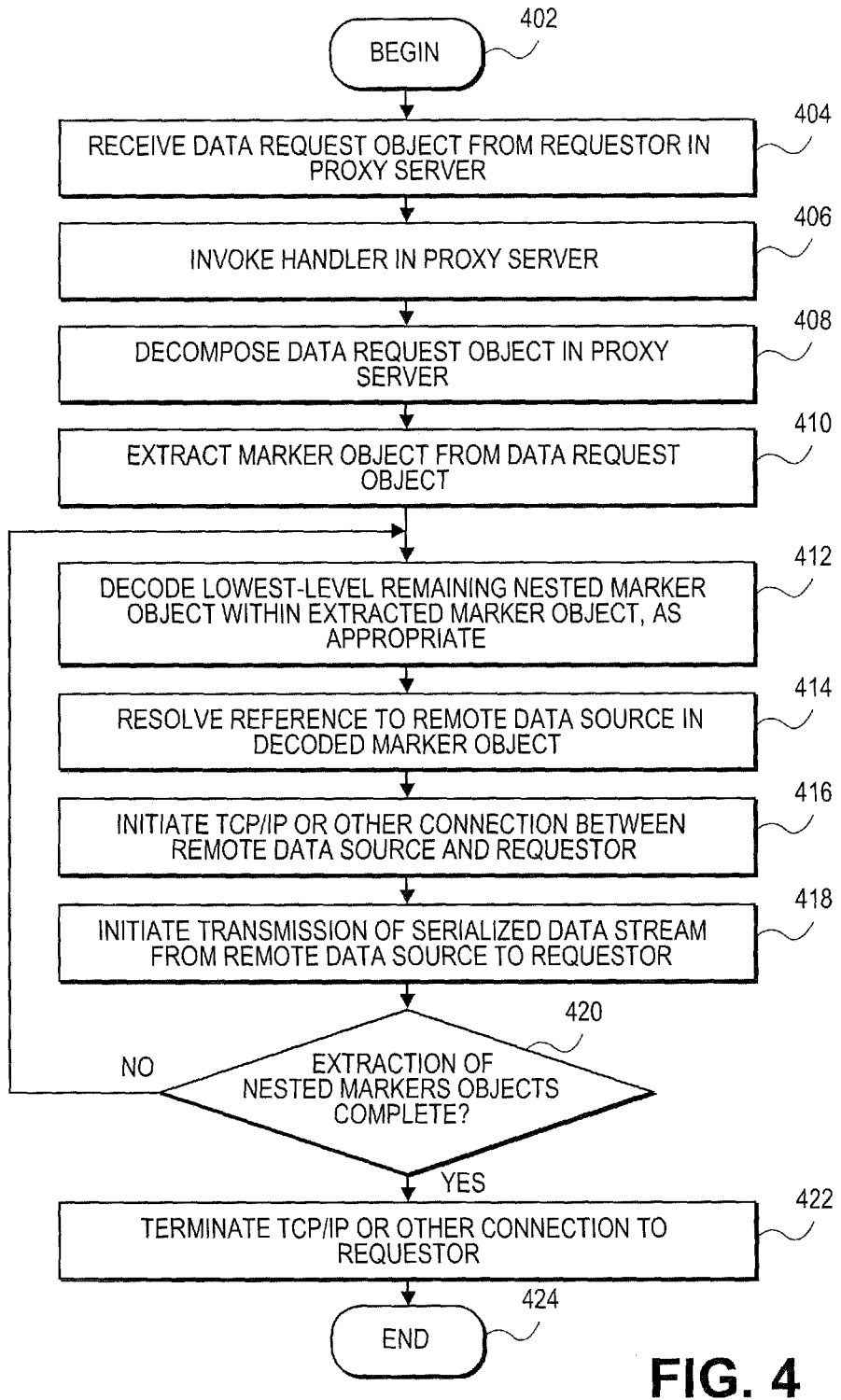
FIG. 4 illustrates a flowchart of overall data serialization processing, according to various embodiments.

FIG. 4 illustrates a flow diagram of overall invocation processing, according to various embodiments of the present teachings. In 402, processing can begin. In 404, a data request object 106 can be received from requester 102 in proxy server 110. In 406, the proxy server 110 can invoke handler 112 to interpret and decode data request object 106. In 408, the handler 112 and/or other logic of proxy server 110 can decompose the data request object 106 into component parts, including marker object 108. In 410, marker object 108 can be extracted from data request object 106. In embodiments, marker object 108 can be a composite or nested marker object or construct, or can be a single-level object.

In 412, the lowest-level remaining nested marker object 108, if any, within the extracted marker object 108 can be decoded, as appropriate. In 414, a reference to a remote data source 114 contained in the decoded marker object 108 can be resolved, for example, to determine an Internet Protocol (IP) or other address of the remote data source 114. In 416, a remote connection 116 between the requestor 102 and remote data source 114 can be initiated. In embodiments, remote connection 116 can be or include a Transfer Control Protocol/Internet Protocol (TCP/IP) connection. In embodiments, other types of connections can also or instead be used.

In 418, the transmission of a serialized data stream from remote data source 114 to requester 102 can be initiated via remote connection 116. The serialized data stream can be or include, for example, media content such as video or audio files, database content or entries, or other information. In 420, a determination can be made whether the extraction of nested marker objects is complete, that is, whether the last level of the set of nested marker objects 124 contained in marker object 108 has been reached and processed. If the determination in 420 is that the extraction of the last nested level of marker object 108 is not complete, processing can return to 412. If the determination in 420 is that the extraction of the last nested level of marker object 108 is complete, processing can proceed to 422. In 422, remote connection 116 for any one or more serialized data stream can be terminated. In embodiments, remote connection 116 can be terminated, for example, by a request to terminate a Transfer Control Protocol/Internet Protocol (TCP/IP) or other connection made by any of requestor 102, proxy server 110, and/or remote data source 114. In 422, processing can repeat, return to a prior processing point, jump to a further processing point, or end.

The foregoing description is illustrative, and variations in configuration and implementation may occur to persons skilled in the art. For example, while embodiments have been described in which remote data is served from a single remote data source 114, in embodiments multiple databases or other sources can be used to supply data to the requester. For further example, while embodiments have been described in which a requestor 102 transmits a single data request object 108 to proxy server 110 or other resource to resolve a remote data, application, or other request, in embodiments requestor 102 can transmit multiple data request objects, at one time or at different times, to a proxy server 110 or other recipient. For further example, while embodiments have been described in which the data request made by the requester 102 is communicated to a single proxy server 110, in embodiments the requester 102 can transmit data request objects to multiple proxy servers or other recipients, servers, nodes, or other resources. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a processor of the server, a data request object from an object-oriented software application over a first connection between the server and a first client device executing the object-oriented software application, wherein the data request object requests a first serialized data stream comprising one or more serialized objects and a second serialized data stream comprising one or more serialized objects;
decomposing, by the processor of the server, the data request object to obtain a marker object comprising a reference to a remote source and a first nested marker object and a second nested marker object, wherein:
the first nested marker object is to indicate that the first serialized data stream at the remote source is to be transmitted directly to the object-oriented software application and to a second client device from the remote source, and
the second nested marker object is to indicate that the second serialized data stream at the remote source is to be transmitted directly to the object-oriented software application from the remote source;
initiating transfer of the first serialized data stream from the remote source to the object-oriented software application over a second connection between the remote source and the first client device;
initiating transfer of the second serialized data stream from the remote source to the object-oriented software application in view of the second nested marker object; and
initiating transfer of the first serialized data stream from the remote source to the second client device in view of the first nested marker object over a third connection between the remote source and the second client device.

2. The method of claim 1, wherein the server is a proxy server.

3. The method of claim 1, wherein the remote source comprises at least one of a remote database or a remote server.

4. The method of claim 1, wherein the serialized data stream comprises at least one of media content or database data.

5. The method of claim 1, wherein the decomposing comprises invoking a handler object to interpret the marker object.

6. The method of claim 1, wherein the marker object further comprises a third nested marker object to further indicate that a third serialized data stream at a second remote source is to be transmitted directly to the object-oriented software application from the remote source.

7. The method of claim 6, further comprising initiating transfer of the third serialized data stream from the second remote source to the object-oriented software application in view of the third nested marker object.

8. The method of claim 1, wherein the serialized data stream is initiated at a first point in time and the second serialized data stream is initiated at a second point in time.

9. A system comprising:
a memory; and
a processor, operatively coupled to the memory, to:
receive a data request object from an object-oriented software application over a first connection between the processor and a first client device executing the object-oriented software application, wherein the data request object requests a first serialized data stream comprising one or more serialized objects and a second serialized data stream comprising one or more serialized objects;
decompose the data request object to obtain a marker object comprising a reference to a remote source and a first nested marker object and a second nested marker object, wherein:
the first nested marker object is to indicate that the first serialized data stream at the remote source is to be transmitted directly to the object-oriented software application and to a second client device from the remote source, and
the second nested marker object is to indicate that the second serialized data stream at the remote source is to be transmitted directly to the object-oriented software application from the remote source;
initiate transfer of the first serialized data stream from the remote source to the object-oriented software application over a second connection between the remote source and the first client device;
initiate transfer of the second serialized data stream from the remote source to the object-oriented software application in view of the second nested marker object; and
initiate transfer of the first serialized data stream from the remote source to the second client device in view of the first nested marker object over a third connection between the remote source and the second client device.

10. The system of claim 9, wherein the remote source comprises at least one of a remote database or a remote server.

11. The system of claim 9, wherein the serialized data stream comprises at least one of media content or database data.

12. The system of claim 9, wherein the processor is further to invoke a handler object to interpret the marker object to decompose the data request object.

13. The system of claim 9, wherein the transfer of the first serialized data stream is via a transfer control protocol/Internet protocol (TCP/IP) connection.

14. The system of claim 9, wherein the transfer of the first serialized data stream is via a transfer control protocol/Internet protocol (TCP/IP) connection.

15. A non-transitory computer-readable storage medium comprising executable instructions that, when executed by a processing device, cause the processing device to perform operations comprising:
    receive a data request object from an object-oriented software application over a first connection between the server and a first client device executing the object-oriented software application, wherein the data request object requests a first serialized data stream comprising one or more serialized objects and a second serialized data stream comprising one or more serialized objects;
    decompose the data request object to obtain a marker object comprising a reference to a remote source and a first nested marker object and a second nested marker object, wherein:
        the first nested marker object is to indicate that the first serialized data stream at the remote source is to be transmitted directly to the object-oriented software application and to a second client device from the remote source, and
        the second nested marker object is to indicate that the second serialized data stream at the remote source is to be transmitted directly to the object-oriented software application from the remote source;
    initiate transfer of the first serialized data stream from the remote source to the object-oriented software application over a second connection between the remote source and the first client device;
    initiate transfer of the second serialized data stream from the remote source to the object-oriented software application in view of the second nested marker object; and
    initiate transfer of the first serialized data stream from the remote source to the second client device in view of the first nested marker object over a third connection between the remote source and the second client device.

16. The non-transitory computer-readable storage medium of claim 15, wherein the server is a proxy server.

17. The non-transitory computer-readable storage medium of claim 15, wherein the remote source comprises at least one of a remote database or a remote server.

18. The non-transitory computer-readable storage medium of claim 15, wherein the serialized data stream comprises at least one of media content or database data.

19. The non-transitory computer-readable storage medium of claim 15, wherein the decompose operation further comprises invoke a handler object to interpret the marker object.

20. The non-transitory computer-readable storage medium of claim 15, wherein the transfer of the first serialized data stream is via a transfer control protocol/Internet protocol (TCP/IP) connection.

* * * * *